Dec. 30, 1958  F. G. GRAVES  2,866,445
PISTON AND COMBUSTION CHAMBER AND INJECTION
NOZZLE MOUNTING CONSTRUCTION FOR
COMPRESSION IGNITION ENGINE
Original Filed June 6, 1955  3 Sheets-Sheet 1

INVENTOR.
FREDERICK G. GRAVES,
BY

Dec. 30, 1958  F. G. GRAVES  2,866,445
PISTON AND COMBUSTION CHAMBER AND INJECTION
NOZZLE MOUNTING CONSTRUCTION FOR
COMPRESSION IGNITION ENGINE
Original Filed June 6, 1955  3 Sheets-Sheet 2

INVENTOR.
FREDERICK G. GRAVES
BY

INVENTOR.
FREDERICK G. GRAVES

United States Patent Office 2,866,445
Patented Dec. 30, 1958

2,866,445

PISTON AND COMBUSTION CHAMBER AND INJECTION NOZZLE MOUNTING CONSTRUCTION FOR COMPRESSION IGNITION ENGINE

Frederick G. Graves, Mahwah, N. J., assignor to Justin W. Macklin, Cleveland, Ohio, as trustee Substituted for abandoned application Serial No. 513,397, June 6, 1955. This application December 19, 1956, Serial No. 629,421

3 Claims. (Cl. 123—32)

This invention relates to internal combustion engines, particularly of the air-cooled type, and in which liquid fuel is injected by high pressure into the engine cylinder in the form of minute streams. This application is a substitute for abandoned application Serial No. 513,397 filed June 6, 1955.

While it is particularly adapted to engines in which ignition is caused by the heat of compression, it may have other means of ignition.

The present adaptation of my invention embodies constructions and combustion chamber design illustrated and described in my prior patent, No. 2,765,779, granted October 9, 1956, which shows an air-cooled cylinder and cylinder head construction and a combustion chamber and valve arrangement of the same general nature, it being understood the present invention constitutes modifications and improvements thereon.

The combustion chamber and ignition method also constitutes a modification of my prior patent, No. 2,709,992, granted June 7, 1955.

The general objects of the present invention are to provide a cylinder head and associated cylinder with air-cooling arrangement, and a unique valve mounting combined with the mounting for the fuel injection nozzle and associated surfaces, such that air streams may effect most efficient cooling of the parts adjacent to the combustion chamber.

A particular specific object of the invention is to provide for efficiently cooling the injection nozzle by an air stream passing at either side thereof while so mounting the nozzle as to insulate it, except for desired heat conduction therefrom adjacent the combustion chamber.

A still further object is to so construct the combustion chamber and contour of the piston head surface as to attain efficient complete combustion.

Various other objects will become apparent in the following description which relates to the accompanying drawings, in which.

Figure 1:
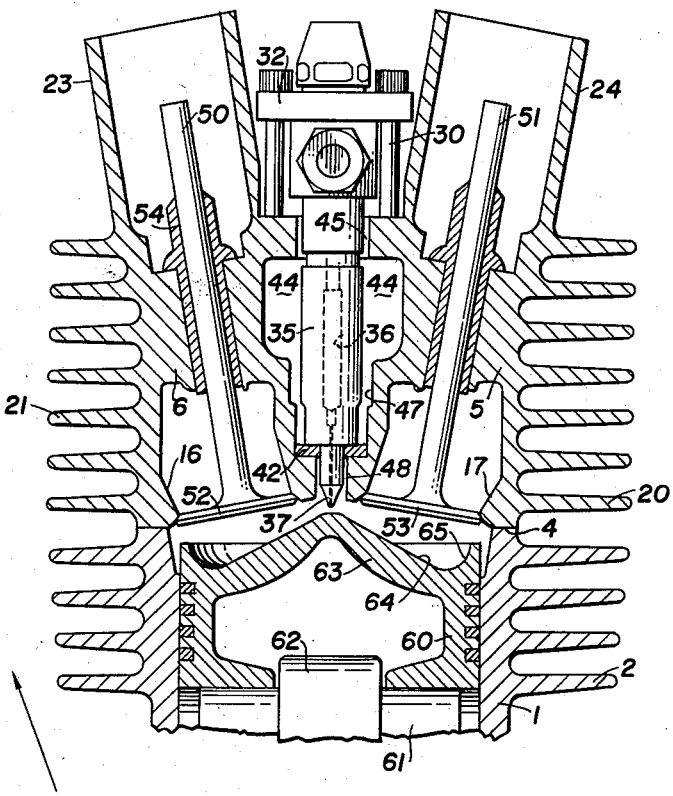
Fig. 1 is a fragmentary sectional view showing the upper portion of the piston, cylinder, cylinder head, valves and injection nozzle.

The cylinder member 1 is shown as provided with air-cooling fins suitably spaced and projecting in substantially radial planes as indicated at 2.

The cylinder head as shown comprises a cast member fitted to the top of the cylinder wall at 4 and includes valve guide portions 5 and 6, intake and exhaust tubular portions 7 and 8 curved outwardly and presenting flanges indicated at 9 and 10 for attachment to the carburetor and exhaust muffler or manifold connection.

The framework includes essentially a cylinder head wall 15 through which the valve openings for the intake and exhaust passages 16 and 17 are formed, while above the valve guides are oval-shaped chambers, the walls of which provide for the bearings and actuating parts for the valve proper. The head member 15 is extended around the cylinder forming a substantially rectangular flange 20, and above the head, at equally spaced distances, are spaced tiers of air-cooling fins 21 and bridge members 22, extending in uniform planes and integral with the valve guides and lower portion of the housings 23 and 24 for the valve mechanisms. The upper one of these air-cooling and bridge support members is designated 25, a portion of which is thickened as at 27 and provided with screw openings as at 28 for the injection nozzle supporting posts 30.

The cylinder head, valve guides, cooling fins and bridge member, as just described, preferably comprise a single unitary casting.

A bridging clamp member indicated at 32 embraces and extends laterally from the upper portion to a conventional form of fuel injection nozzle 35, the supporting posts 30 extending through the bridge member and being threaded into a thickened portion 27 in the threaded openings 28.

Figure 7:
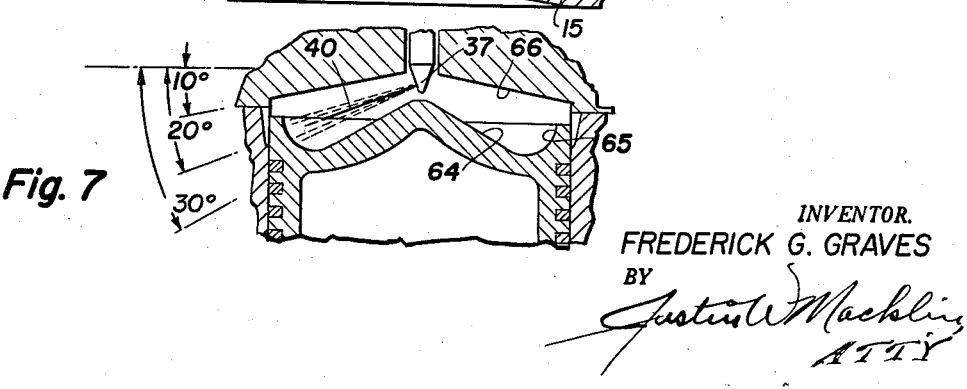
Fig. 7 is a somewhat diagrammatic fragmentary sectional view showing the piston in its innermost or dead center position, and showing a fuel jet stream.
Figure 5:
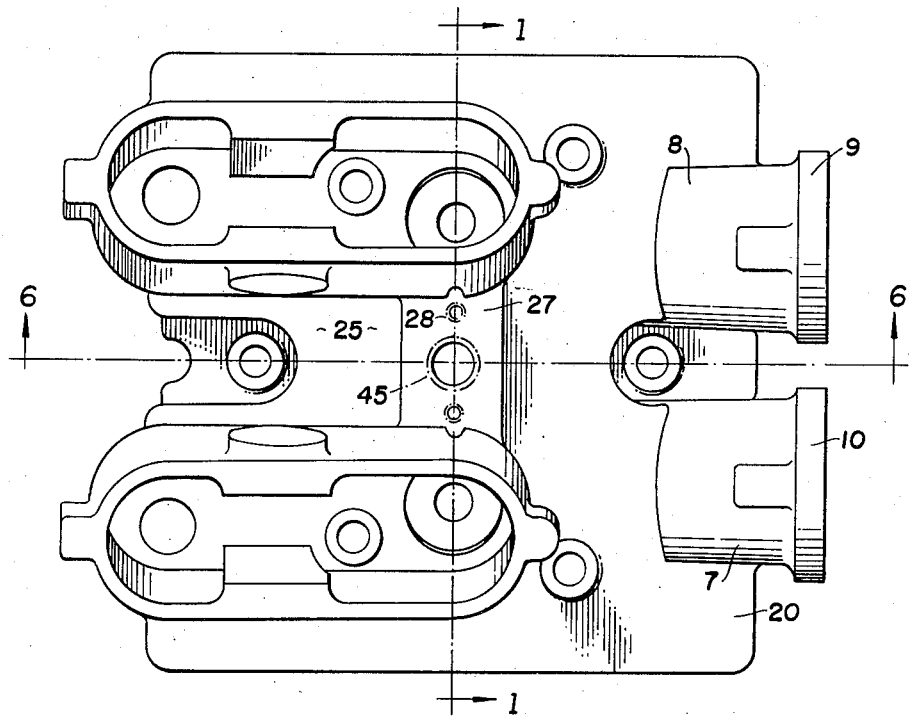
Fig. 5 is a plan view of the cylinder head casting before machining.
Figure 6:
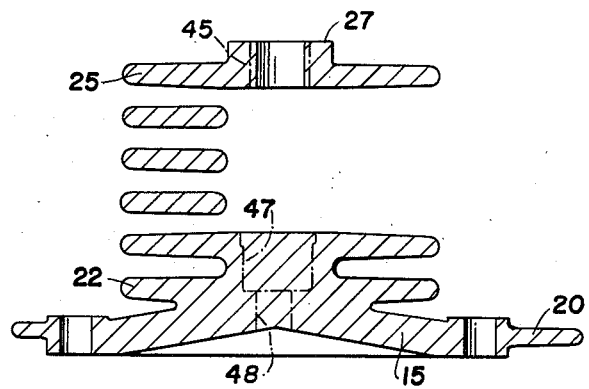
Fig. 6 is a section through the same on the plane indicated by the line 6—6 of Fig. 5; the line 1—1 on Fig. 5 also shows the position of the plane of the section of Fig. 1.

The injection controlling mechanism of the nozzle is indicated in broken lines at 36. It may be assumed that the timing of the injection is controlled in the usual manner with relation to the cycle of the piston stroke. The tip of the nozzle indicated at 37 is provided with orifices spaced to direct fuel streams over the piston head, as will presently appear, after the manner described in my above mentioned patent, No. 2,709,992. Such a spray stream is indicated at 40 in Fig. 7.

The nozzle above the tip portion presents a shoulder to a heat conducting washer-like seal 42 of copper or the like. This forms the only contact between the adjacent hot portions of the cylinder head and the injection nozzle.

The air passages 44 at either side of the body of the nozzle effect a cooling above the seal 42. The opening 45 through the bridge member 27 is preferably also larger than the body of the nozzle to prevent conductive contact, while below these openings, the casting is spaced as at 47 from the nozzle, and at 48 the opening receiving the tip is also out of contact with the tip portion of the nozzle.

The valves shown are of the poppet valve type having stems 50 and 51 slidable in valve stem sleeve guides 54 and valve heads 52 and 53 fitting valve seats to close the intake and exhaust passages. The valve stems and valve heads are positioned at a diverging angle, as shown, to conform to the design and purpose of leaving the spaces 44, and also presenting the valve heads at an angle conforming to the conical slope of the inner surface of the cylinder head.

The piston 60 is of course provided with the usual wrist pin 61 embraced by the connecting rod 62. The head of the piston 63 presents a conical surface 64 extending downwardly from a narrow flat top portion and then curving upwardly as at 65 to present a flange at the upper perimeter of the piston top.

The fuel injection streams 40 (Fig. 7) are at an angle, preferably bi-secting the angle between the sloping surface 64 and the inner surface 66 of the head.

In extensive experiments and development of a very successful engine with high performance, I have found that an angle of 10° slope, from a radial plane, for the cone surface 66 of the cylinder head, an angle of 30° for the surface 64, and an angle of 20°, namely half way between, is most satisfactory for the direction of the jet stream or spray. That is, the axis of the jet orifices should be about half way between an approximate 20° angle of divergence between the surfaces of the cylinder head and the cone surface 64. The curvature 65, terminating in the thin flange at the top of the piston, should be spaced approximately as shown, whereby the jet stream is directed to the inner surface. Incidentally, I have found in practice that an effective spray and ignition result in avoiding impingement of fuel against the piston surface, even at the flange, in direct line with the fuel spray.

As indicated in my above identified patent, No. 2,709,992, contours of a piston top having a central dome or cone have been heretofore proposed. However, there are critical relationships of dimensions of the height of the cone and the depth of the annular trough, and, likewise, the height of the flange 65 has a preferred relationship to the height of the cone and to the slope of the inner cylinder head surface and to the direction of the fuel jets. The flange should have a narrow top perimeter, and the cone should be approximately one-sixth to one-fifth of the diameter of the piston above the trough.

With the construction disclosed in my prior patent, surprising and exceptional results were attained by the use of specially shaped curving grooves in the surface of this cone. However, under favorable conditions, and still with relatively low compression ratios, satisfactory results may be obtained with the shape and proportions herein shown and described.

It is understood that six or more angularly spaced injection jet openings may be formed in the nozzle, each having the preferred angle of discharge intermediate the 10° and 30° angles of the cylinder head and piston cone slope 64.

Figure 2:
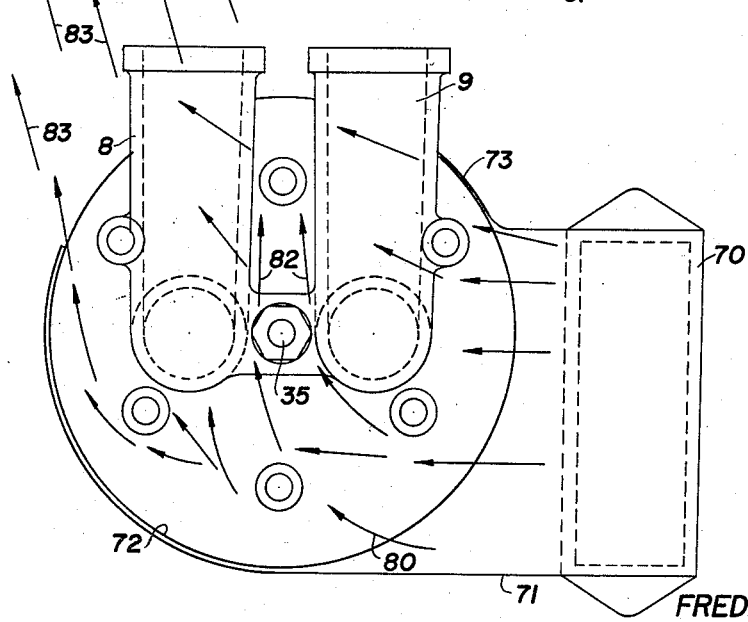
Fig. 2 is a plan view illustrating cooling air flow.
Figure 3:
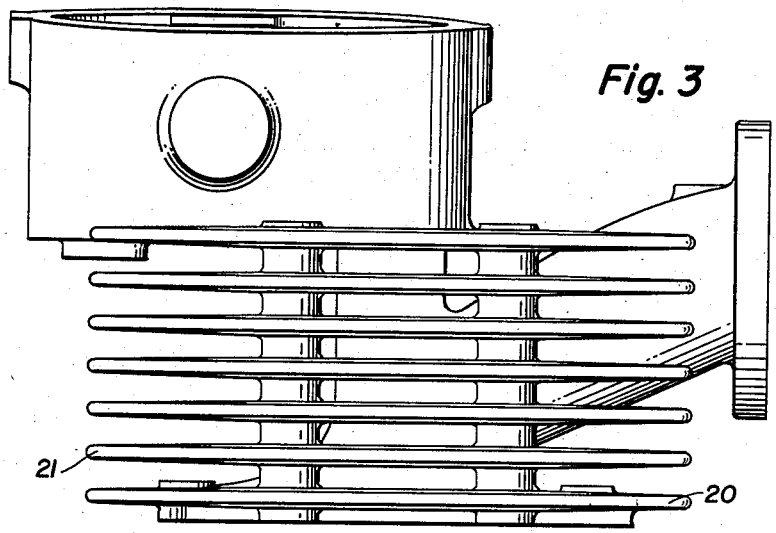
Fig. 3 is a side elevation of the cylinder head casting before machining.
Figure 4:
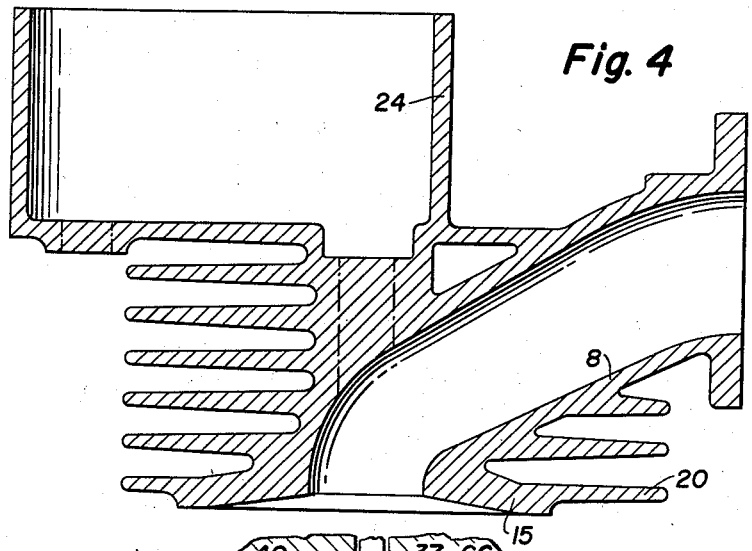
Fig. 4 is a section through the same, taken on a plane through the valve pocket chamber and through the inlet (or exhaust) passage.

Fig. 2 is a somewhat "phantom view" diagrammatically illustrating air flow for cooling of the fins 2 of the cylinder and for causing the cooling air streams to pass at both sides of the nozzle 35, through the spaces 44 of Fig. 1.

Referring to this diagrammatic illustration of Fig. 2, a vertical air passage 70 may bring air from a fan, not shown, but which may be carried by the fly wheel as illustrated in my prior application, Patent No. 2,765,779. This air stream is turned into a transverse passage 71, and which is continued in thin metal shield or housing curving as at 72 and 73 around the cooling fins, there indicated as circular. The direction of the air flow is indicated by arrows 80 as flowing over the fins and curving through the passages 44 as indicated by the arrows 82, as well as around the valve guide supports and to the open air, as indicated at 83.

I claim:

1. An internal combustion engine designed to start and run on compression alone, comprising a cylinder and a piston therein and a cylinder head having a plurality of spaced radiating cooling fins and having a conical inner surface sloped at approximately 10° with relation to a radial plane, the piston having a centrally disposed conical surface sloping away from the head at about 30° and then curving upwardly and terminating near the perimeter of the piston, intake and exhaust valves and guides therefor mounted in the cylinder head and at an angle of approximately 10° from the axis of the cylinder and spaced apart, a fuel injection nozzle mounted between said valves and having a tip portion projecting into the space below the sloping surface of the cylinder head and having a shoulder near its inner end, clamping means engaging the outer end of the injection nozzle for attaching it to the cylinder head and urging the shoulder inwardly, the nozzle being spaced from surrounding metal except for said clamping means and shoulder and leaving air passages between the nozzle and the valve guide supports, and means for causing air to pass around the valve nozzle and over said cooling fins.

2. An internal combustion engine comprising a piston, cylinder and cylinder head with intake and exhaust valves and valve guide supports therefor, said supports being spaced apart leaving an air passage therebetween, a fuel injection nozzle mounted in the cylinder head and spaced from the valve guide mountings, the cylinder head structure and valve guide supports being provided with radiating cooling fins, the space between the valve guides providing an air passage around the injection nozzle positioned therebetween, a bridge member extending between the valve guide supports and through which the nozzle extends, and clamping means attached to the bridge and engaging the outer end of the nozzle.

3. An internal combustion engine comprising a piston, cylinder and cylinder head with intake and exhaust valves and valve guide supports therefor, said supports being spaced apart leaving an air passage therebetween, a fuel injection nozzle mounted between the valves and valve guide supports and spaced therefrom and having a tip portion projecting into the cylinder, the cylinder head and injection nozzle having complimentary shoulders adjacent the tip of the injection nozzle, a heat conducting washer-like seal between said shoulders, clamping means engaging the outer end of the injection nozzle and urging the nozzle shoulder inwardly, the nozzle being spaced from surrounding metal except for said clamping means and said shoulders and seal, the valve guide supports having integral radiating cooling fins, and means for causing air to pass around the valve nozzle and over the cooling fins.

References Cited in the file of this patent

UNITED STATES PATENTS

| | | |
|---|---|---|
| 2,322,606 | Ward | June 22, 1943 |
| 2,699,358 | Sonderegger | Jan. 11, 1955 |
| 2,709,992 | Graves | June 7, 1955 |

FOREIGN PATENTS

| | | |
|---|---|---|
| 444,806 | Great Britain | Mar. 27, 1936 |
| 900,899 | France | Oct. 23, 1944 |